US011557303B2

United States Patent
Hicks et al.

(10) Patent No.: US 11,557,303 B2
(45) Date of Patent: Jan. 17, 2023

(54) FRICTIONLESS HANDOFF OF AUDIO CONTENT PLAYING USING OVERLAID ULTRASONIC CODES

(71) Applicant: International Business Machines Corporation, Armonk, NY (US)

(72) Inventors: Andrew Hicks, Raleigh, NC (US); Brendan Bull, Durham, NC (US); Scott Robert Carrier, Apex, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 16/526,131

(22) Filed: Jul. 30, 2019

(65) Prior Publication Data

US 2021/0035589 A1 Feb. 4, 2021

(51) Int. Cl.
| | |
|---|---|
| *G10L 19/018* | (2013.01) |
| *H04L 65/1059* | (2022.01) |
| *H04L 65/1094* | (2022.01) |
| *H04L 65/61* | (2022.01) |
| *H04L 65/70* | (2022.01) |

(Continued)

(52) U.S. Cl.
CPC ........ *G10L 19/018* (2013.01); *H04L 65/1086* (2013.01); *H04W 36/18* (2013.01)

(58) Field of Classification Search
CPC combination set(s) only.
See application file for complete search history.

(56) References Cited

U.S. PATENT DOCUMENTS 10,958,966 B2 * 3/2021 Jeyachandran .... H04N 21/2187
2016/0205397 A1    7/2016 Martin et al.
(Continued)

FOREIGN PATENT DOCUMENTS

FR    2766312 B1    9/1999

OTHER PUBLICATIONS

"Know Where Your Music Goes", Digimarc Barcode, retrieved from [https://www.digimarc.com/products/digimarc-barcode/audio] on Mar. 31, 2019.

(Continued)

*Primary Examiner* — Pierre Louis Desir
*Assistant Examiner* — Keisha Y. Castillo-Torres
(74) *Attorney, Agent, or Firm* — Brandon L. Stephens

(57) ABSTRACT

In a frictionless handoff of audio content playing, a client device listens for ultrasonic audio. The client hears a playing of a modified audio content by another client device, which includes audio content and an ultrasonic audio quick response (QR) code overlaid on the audio content. The ultrasonic audio QR code includes location information corresponding to a location in the audio content. The client device extracts the ultrasonic audio QR code from the modified audio content. After determining that the playing of the modified audio content has stopped, the client device receives a command to resume playing of the audio content on the client device. In, response to the command, the client device retrieves location information in a last extracted ultrasonic audio QR code and plays the audio content starting at a location in the audio content corresponding to the location information in the last extracted ultrasonic audio QR code.

20 Claims, 4 Drawing Sheets

(51) Int. Cl.
*H04L 65/1083* (2022.01)
*H04W 36/18* (2009.01)

(56) References Cited

U.S. PATENT DOCUMENTS

2016/0224314 A1    8/2016  Vega-Zayas et al.
2020/0082816 A1*   3/2020  Mahajan ................ G10L 25/51

OTHER PUBLICATIONS

Anonymous, "A method to instruct devices through audio QR code", IP.com, Mar. 22, 2019.
I. Dagan et al., "Delivery of QR codes to cellular phones through data embedding in audio," 2016 IEEE International Conference on the Science of Electrical Engineering (ICSEE), Eilat, Nov. 2016, pp. 1-4.
IBM, "Methods for Digital Tape Copy Protection", IP.com, Jan. 31, 2005.
N. Vogt, "Link To A Specific Time In A YouTube Video", retrieved from [https://www.h3xed.com/web-and-internet/link-to-a-specific-time-in-a-youtube-video], Jan. 26, 2018.
Oona Raisanen,"Time-coding Audio Files", retrieved from [http://www.windytan.com/2014/06/time-coding-audio-files.html], Jun. 9, 2014.
P. Chen et al., "Pushing Information Over Acoustic Channels", 2009 IEEE International Conference on Acoustics, Speech and Signal Processing, Taipei, Apr. 2009, pp. 1421-1424.
S. Perez, "Lisnr's data-over-audio technology aims to replace QR code scanning, NFC—TechCrunch", retrieved from [https://techcrunch.com/2017/05/16/lisnrs-data-over-audio-technology-aims-to-replace-qr-code-scanning-nfc/], May 16, 2017.

\* cited by examiner

FRICTIONLESS HANDOFF OF AUDIO CONTENT PLAYING USING OVERLAID ULTRASONIC CODES

BACKGROUND

Services exist that use audio fingerprinting to create a snapshot of audio content that allows a service to efficiently look up the identity of the audio content in a database. However, the identity depends upon the existence of the audio content fingerprint in the database. When audio content is not fingerprinted or archived, such as when the audio content is too obscure or niche to warrant fingerprinted or archiving, the audio content cannot be identified. Without the ability to identify the audio content, other services cannot be provided to consumers for the audio content. Further, the identifying of, the audio content often depends on the existence of a network connection between a client device and the service provider, and further depends on server calls by the client device over the network.

SUMMARY

Disclosed herein is a method for frictionless handoff of audio content playing between devices using overlaid ultrasonic codes, and a computer program product and system as specified in the independent claims. Embodiments of the present invention are given in the dependent claims. Embodiments of the present invention can be freely combined with each other if they are not mutually exclusive.

According to an embodiment of the present invention, a client device listens for ultrasonic audio. The client device hears a playing of a modified audio content by another client device. The modified audio content comprising audio content and at least one ultrasonic audio quick response (QR) code overlaid on the audio content. The at least one ultrasonic audio QR code includes at least location information corresponding to a location in the audio content. The client device extracts the at least one ultrasonic audio QR code from the modified audio content. The client device determines that the playing of the modified audio content has stopped. After determining that the playing of the modified audio content has stopped, the client device receives a command to resume playing of the audio content on the client device. In response to the command, the client device retrieves location information in a last extracted ultrasonic audio QR code and plays the audio content starting at a location in the audio content corresponding to the location information in the last extracted ultrasonic audio QR code.

DETAILED DESCRIPTION

Figure 1:
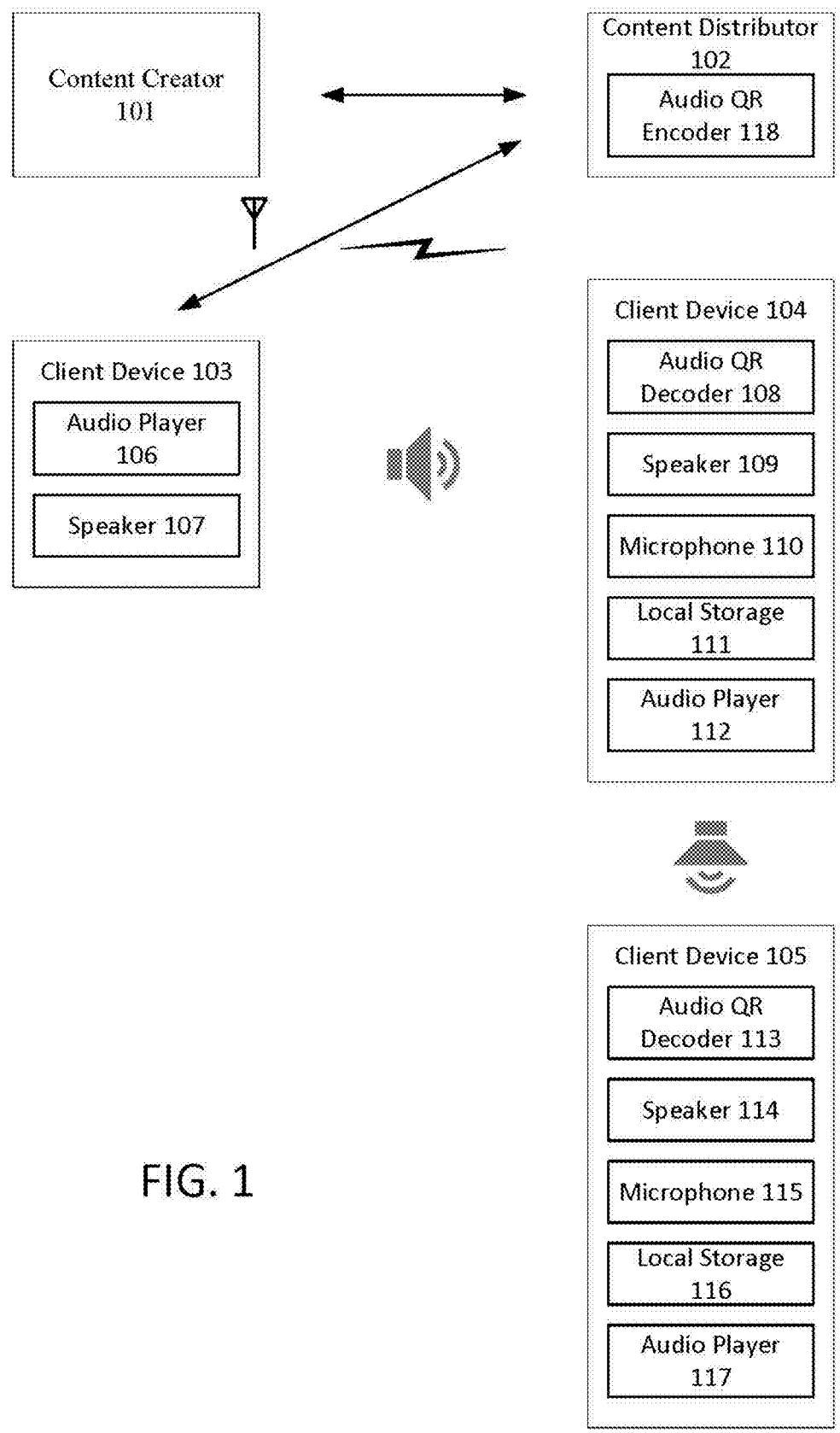
FIG. 1 illustrates an exemplary system for frictionless handoff of audio content playing using overlaid ultrasonic codes according to the present invention.

FIG. 1 illustrates an exemplary system for frictionless handoff of audio content playing using overlaid ultrasonic codes according to the present invention. The system includes a content creator 101 who uploads audio content to a content distributor 102. In exemplary embodiments, the content distributor 102 provides a service that broadcasts or streams audio content over the air or over a network (not shown). The content creator 101 and the content distributor 102 may be the same or different entities. The content distributor 102 includes an audio quick response (QR) encoder 118 configured to modify the audio content by overlaying ultrasonic audio QR codes onto the audio content. Ultrasonic audio QR is a data communication mechanism between devices through ultrasonic sound waves, with frequencies above the normal hearing range of humans. The ultrasonic audio QR code includes at least location information corresponding to a given location in the audio content. In an exemplary embodiment, a plurality of ultrasonic audio QR codes are overlaid on the audio content in a periodic fashion, where each ultrasonic audio QR code corresponds to a given location in the audio content. The system further includes a first client device 103 configured to receive the modified audio content. The first client device 103 includes an audio player 106 capable of playing the modified audio content over a set of one or more speakers 107. A second client device 104 is configured with the capability to hear ultrasonic audio in the environment, of the second client device 104 via a set of one or more microphones 110. The second client device 104 includes an audio QR decoder 108 configured to extract the ultrasonic audio QR codes from the ultrasonic audio. The ultrasonic audio QR codes are then stored in a local storage 111.

Figure 2:
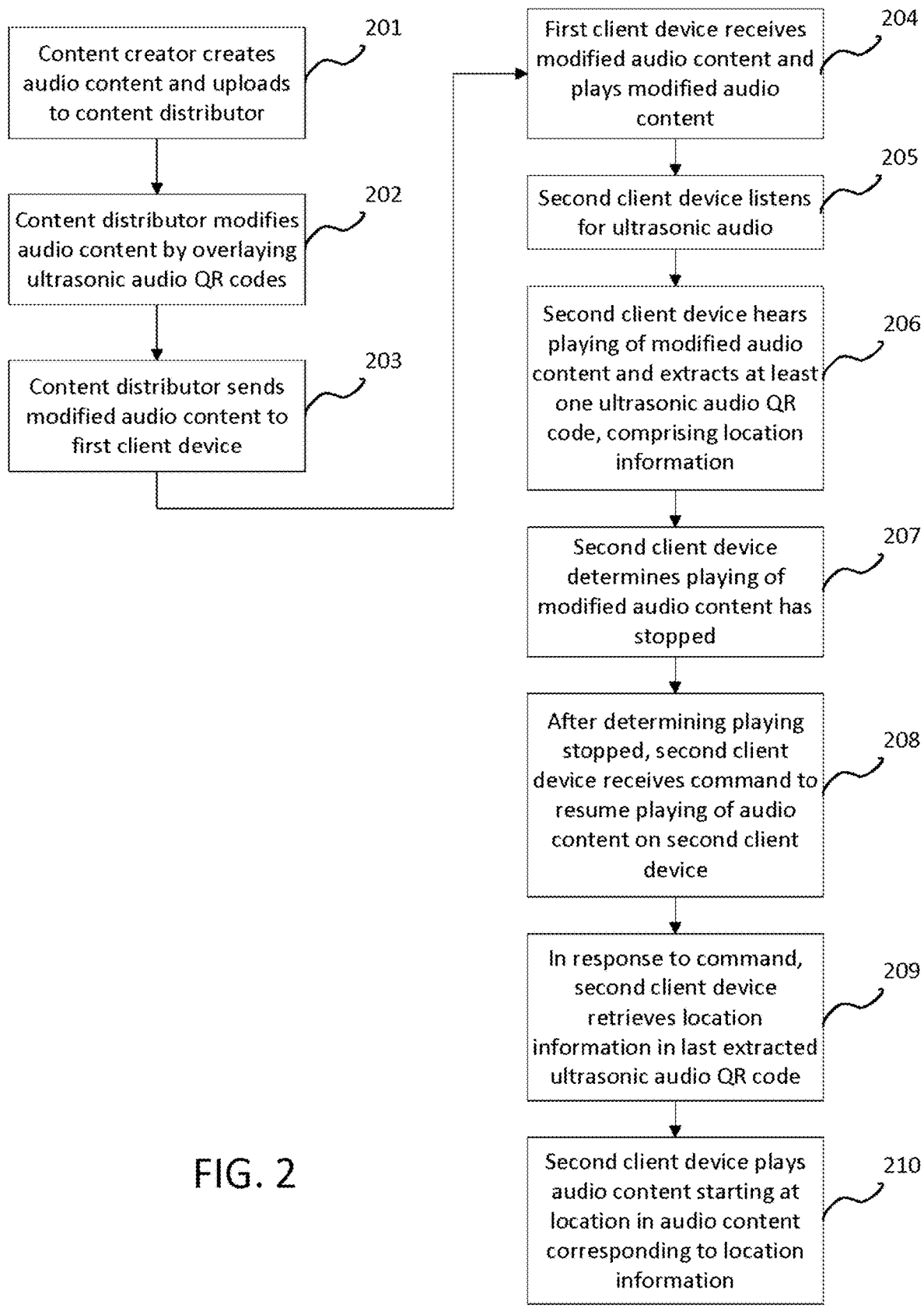
FIG. 2 illustrates an exemplary method for frictionless handoff of audio content playing using overlaid ultrasonic codes according to the present invention.

FIG. 2 illustrates an exemplary method for frictionless handoff of audio content playing using overlaid ultrasonic codes according to the present invention. Referring to both FIGS. 1 and 2, the content creator 101 creates audio content and uploads the audio content to the content distributor 102 (201). The content distributor 102, using the audio QR encoder 118 modifies the audio content by overlaying one or more ultrasonic audio QR codes onto the audio content (202). An ultrasonic audio QR code includes at least location information corresponding to a location in the audio content and optionally metadata, such as an identity of the audio content and/or how to access the audio content. In some embodiments, the ultrasonic audio QR code includes a Uniform Resource Locator (URL) that embeds information on where the audio content may be accessed, an identity of the audio content, and a timestamp. The ultrasonic audio QR code differs from audio watermarking at least in its purpose. In audio watermarking, a pattern is encoded into the audio data, where the pattern is not detectable by human ears. A copy of the audio data can then be examined to determine whether the pattern exists to authenticate the copy for digital rights management purposes. The pattern in audio watermarking are not configured to convey location or timing information or to be used in a handoff between devices as described herein.

The content distributor 102 sends the modified audio content to the first client device 103 (203). In some embodiments, the content distributor 102 broadcasts the modified, audio content over the air. In other embodiments, the content distributor 102 streams the modified audio content to the first client device 103 over a network.

The first client device 103 receives the modified audio content and plays the modified audio content using its audio player 106. The audio player 106 outputs audio signals through a set of speakers 107, where the audio signals include the audible frequencies containing the audio content and the ultrasonic frequencies containing at least one audio QR code. A second client device 104 listens for ultrasonic audio (205). In an exemplary embodiment, the second client device 104 is configured in a listening mode to listen for any ultrasonic audio in its environment. The second client device 104 need not be configured to specifically listen for audio content played by the first client device 103, by any other specific device, or for any specific audio content. Unlike some other communication mechanisms, such as near field communication (NFC), the second client device 104 need not have a "line of sight" to the first client device 103. The second client device 104 hears the playing of the modified audio content by the first client device 103 by capturing the audio signals, via a set of one or more microphones 110, output through the set of speakers 107 of the first client device 103. The audio QR decoder 108 of the second client device 104 processes the audio signals and extracts at least one ultrasonic audio QR code played by the first client device 103, where the at least one ultrasonic audio QR code comprises location information corresponding to a location in the audio content (206). In an exemplary embodiment, the second, client device 104 detects pulses in the ultrasonic frequencies, which correspond to one or more audio QR codes, and converts the pulses into the location information and any other metadata in the audio QR code(s). The location information and any metadata are stored in the local storage 111 at the second client device 104.

At some point in time, the second client device 104 determines that the playing of the modified audio content has stopped (207). The playing is determined to be stopped when the second client device 104 no longer hears ultrasonic audio, such as when the second client device 104 moves out of range from the first client device 103. The last extracted ultrasonic audio QR code represents the location in the modified audio content at which the playing stopped. After determining that the playing of the modified audio content has stopped, the second client device receives a command to resume the playing of the audio content on the second client device 104 (208). In some embodiment, in response to detecting that the playing of the modified audio content has stopped, the second client device 104 prompts the user for a command to resume the playing of the audio content on the second client device 104. For example, the audio QR decoder 108 displays a notification on a screen (not shown) of the second client device 104 and asks the user whether the user wishes to resume the playing of the audio content on the second client device 104. Alternatively, the audio OR decoder 108 can be configured to automatically trigger a command to the audio player 112 to resume the playing of the audio content upon determining that the playing by the first client device 103 has stopped.

In response to the command to resume the playing of the audio content on the second client device 104, the second client device 104 retrieves the location information in the last extracted ultrasonic audio OR code (209). The second client device 104 plays the audio content starting at the location in the audio content corresponding to the location information (210). Optionally, the second client device 104 can give the user the option to resume play from a location different from the location matching the location information (e.g. replay from the beginning). In an exemplary embodiment, the last extracted ultrasonic audio QR code comprises an URL. From the URL, the second client device 104 connects with the location where the audio content is accessible, accesses the audio content using its identity in the URL, matches the location information with the corresponding location in the audio content, and resumes the playing of the audio content from the corresponding location. The audio content played by the second client device 104 can be either the audio content without the overlaid ultrasonic audio QR codes or the modified audio content that includes the overlaid ultrasonic audio QR codes.

The above described handoff does not require any network connection between the first client device 103 and the second client device 104, nor does the handoff require any server calls by either the first or second client device 103-104. Further, the handoff does not require compatibility between the first and second client device 103-104 other than the ability for the first client device 103 to play the ultrasonic audio QR codes and the ability for the second client device 104 to hear and interpret the played ultrasonic audio QR codes. The embodiments of the present invention thus provide a frictionless handoff of audio content playing between client devices using overlaid ultrasonic codes in an ecosystem agnostic manner.

For example, assume that the first client device 103 is a radio in a vehicle of a user, where the radio plays a podcast that's overlaid with ultrasonic audio QR codes (204). The second client device 104 is a smartphone of the user that is also in the vehicle and is configured in a listening mode to listen for ultrasonic audio in its environment (205). The smartphone hears the playing of the podcast by the radio and extracts at least one ultrasonic audio QR code (206). The smartphone processes the ultrasonic audio QR code to obtain the location information and any metadata and stores the location information and metadata in its local storage. Assume that the user then steps out of the vehicle and moves out of range from the radio. The smartphone determines that the playing of the podcast has stopped (207). The smartphone displays a notification on its screen with the option to resume the playing of the podcast. Assume that the user issues the command to resume the playing of the podcast on the smartphone (208). In response, the smartphone retrieves from its local storage the location information and metadata that was in the last extracted ultrasonic audio QR code (209), connects with the podcast service using the metadata, and resumes playing the podcast starting at the location in the podcast corresponding to the location information (210).

Figure 3:
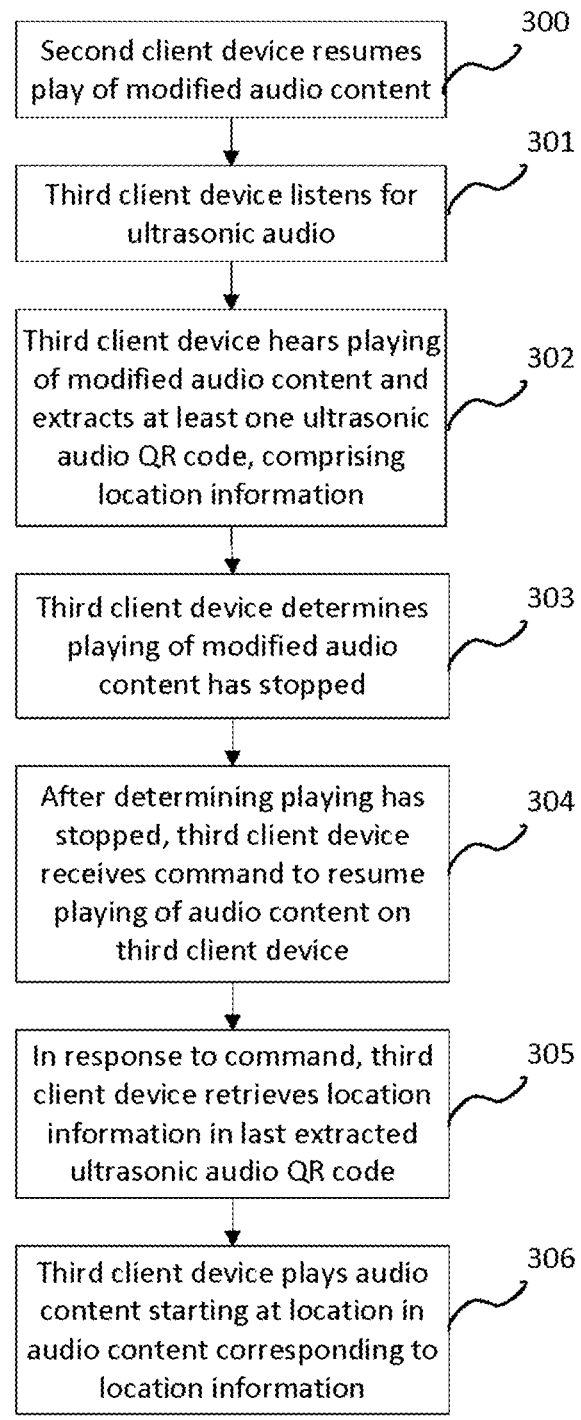
FIG. 3 illustrates an exemplary method for relayed frictionless handoff of audio content playing using overlaid ultrasonic codes according to the present invention.

In another exemplary embodiment, the frictionless handoff of audio content playing is relayed to a third client device, as set forth in FIG. 3. Referring to FIGS. 1 and 3, the second client device resumes the playing of the modified audio content at the location corresponding to the location information, as described above, via its audio player 112 (300). Audio signals are output through a set of one or more speakers 109 of the second client device 104, where the audio signals include the audible frequencies for the audio content and the ultrasonic frequencies of at least one audio QR code. The third client device 105 is configured in a listening mode to listen for any ultrasonic audio in its environment (301). The third client device 105 need not be configured to specifically listen for audio content played by the second client device 104, by any other specific device, or for, any specific audio content. The third client device 105 hears the playing of the modified audio content by capturing the audio signals, via a set of one or more microphones 115, output through the set of speakers 109 of the second client device 104. The audio QR decoder 113 of the third, client device 105 processes the audio signals and extracts at least one ultrasonic audio QR code where the at least one ultrasonic QR code comprises location information corresponding to a location in the audio content (302). The extracted ultrasonic audio QR code is stored in the local storage 116 at the third client device 105.

At some point in time, the third client device 105 determines that the playing of the modified audio content has stopped (303). Afterwards, the third client device 105 receives a command to resume the playing of the audio content on the third client device 105 (304). In response to the command, the third client device 105 retrieves the location information in the last extracted ultrasonic audio QR code (305). The third client device 105 plays the audio content starting at the location in the audio content corresponding to the location information (306).

Continuing with the example set forth above, assume that the third client device 105 is a smart speaker in the user's home. Assume that the smartphone is playing the podcast, resumed from the playing by the radio, when the user enters her home (300). The smart speaker is configured to listen for ultrasonic audio in its environment (301). Assume that the smart speaker hears the playing of the podcast by the smartphone and extracts at least one ultrasonic audio QR code (302). The smart speaker stores the location information and any metadata in the ultrasonic audio QR code in its local storage. Assume that the playing of the podcast by the smartphone stops, such as when the user manually stops the playing or when the smartphone loses its connection to the podcast service. The smart speaker determines that the playing of the podcast has stopped (303), and in response, outputs an audible notification via a set of one or more speakers 114 to ask the user whether she wishes to resume the playing of the podcast on the smart speaker. Assume that the user issues the command to resume the playing of the podcast on the smart speaker (304). In response, the smart speaker retrieves the location information in the last extracted ultrasonic audio QR code (305) stored in its local storage, connects with the podcast service using the metadata, and resumes playing the podcast starting at the location in the podcast corresponding to the location information (306).

Although embodiments of the present invention are described above in the context of ultrasonic audio QR codes, other types of mechanisms for communicating information between devices over audio can be used without departing from the spirit and scope of the present invention.

Figure 4:
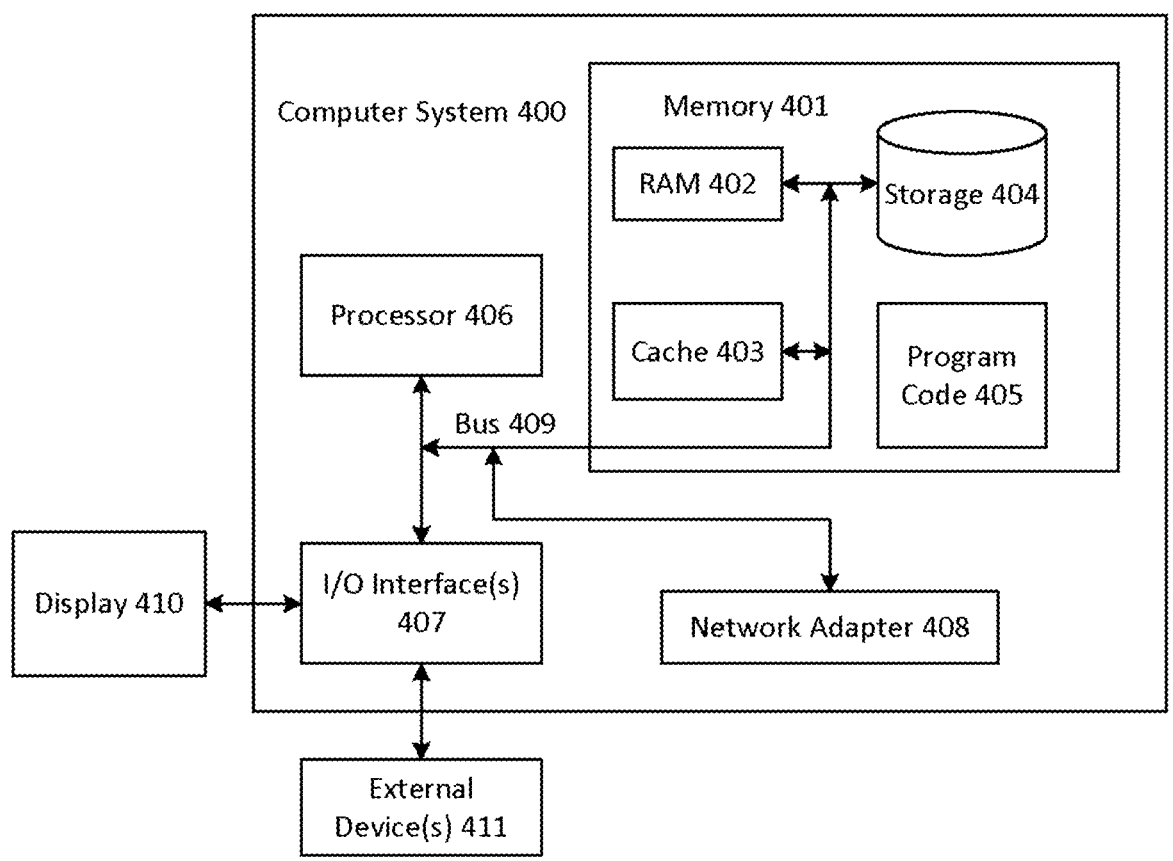
FIG. 4 illustrates a computer system, one or more of which implements the frictionless handoff of audio content playing using embedded ultrasonic codes, according to embodiments of the present invention.

FIG. 4 illustrates a computer system, or computing device, one or more of which implements the frictionless handoff of audio content playing using embedded ultrasonic codes, according to embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium onto an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished, as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for frictionless handoff of audio content playing between devices, comprising:
   listening for ultrasonic audio by a client device;
   hearing, by the client device, a playing of a modified audio content by another client device, the modified audio content comprising audio content and at least one ultrasonic audio quick response (QR) code overlaid on the audio content, the at least one ultrasonic audio QR code comprising at least location information corresponding to a location in the audio content and a URL hyperlink;
   extracting, by the client device, the location information and the URL hyperlink in the at least one ultrasonic audio QR code from the modified audio content locally without accessing an external computing device;
   determining, by the client device, that the playing of the modified audio content has stopped;
   after determining that the playing of the modified audio content has stopped, receiving, by the client device, a command to resume playing of the audio content on the client device;
   in response to the command, accessing, by the client device, the URL hyperlink from the ultrasonic QR code;
   in response to the command, retrieving, by the client device, location information in a last extracted ultrasonic audio QR code; and
   playing, by the client device, the audio content starting at a location in the audio content corresponding to the location information in the last extracted ultrasonic audio QR code.

2. The method of claim 1, wherein the hearing of the playing of the modified audio content by the other client device comprises:
   capturing, by the client device, audio signals output by the other client device, the audio signals comprising audible frequencies containing the audio content and ultrasonic frequencies containing the at least one ultrasonic audio QR code.

3. The method of claim 2, wherein the extracting of the at least one ultrasonic audio QR code comprises:
   detecting, by the client device, pulses in the ultrasonic frequencies in the audio signals; and
   converting, by the client device, the pulses into at least the location information in the at least one ultrasonic audio QR code.

4. The method of claim 1, wherein the last extracted ultrasonic audio QR code further comprises metadata, the metadata comprising a location where the audio content is accessible and an identity of the audio content, wherein the playing of the audio content by the client device comprises:
   connecting, by the client device, to the location where the audio content is accessible;
   accessing, by the client device, the audio content using the identity;
   matching, by the client device, the location information in the last extracted ultrasonic QR code with a given location in the audio content; and
   playing, by the client device, the audio content starting at the given location.

5. The method of claim 1, wherein the client device does not have a network connection to the other client device.

6. The method of claim 1, wherein the modified audio content comprising a plurality of ultrasonic audio QR codes overlaid on the audio content in a periodic manner, wherein each of the plurality of ultrasonic audio QR codes corresponds to a given location in the audio content.

7. The method of claim 1, wherein the playing of the determining that the playing of the modified audio content has stopped, comprises:
   determining, by the client device, that the client device no longer hears any ultrasonic audio.

8. A computer program product for frictionless handoff of audio content playing between devices, the computer program product comprising a computer readable storage medium having program instructions embodied therewith, the program instructions executable by a computing client device to cause the computing client device to:
   listen for ultrasonic audio;
   hear a playing of a modified audio content by another client device, the modified audio content comprising audio content and at least one ultrasonic audio quick response (QR) code overlaid on the audio content, the at least one ultrasonic audio QR code comprising at least location information corresponding to a location in the audio content and a URL hyperlink;
   extract the location information and the URL hyperlink in the at least one ultrasonic audio QR code from the modified audio content locally without accessing an external computing device;
   determine that the playing of the modified audio content has stopped;
   after determining that the playing of the modified audio content has stopped, receive a command to resume playing of the audio content on the client device;
   in response to the command, accessing, by the client device, the URL hyperlink from the ultrasonic QR code;
   in response to the command, retrieve location information in a last extracted ultrasonic audio QR code; and
   play the audio content starting at a location in the audio content corresponding to the location information in the last extracted ultrasonic audio QR code.

9. The computer program product of claim 8, wherein in the hearing of the playing of the modified, audio content by the other client device, the computing client device is further caused to:
   capture audio signals output by the other client device, the audio signals comprising audible frequencies containing the audio content and ultrasonic frequencies containing the at least one ultrasonic audio QR code.

10. The computer program product of claim 9, wherein in the extracting of the at least one ultrasonic audio QR code, the computing client device is further caused to:
   detect pulses in the ultrasonic frequencies in the audio signals; and
   convert the pulses into at least the location information in the at least one ultrasonic audio QR code.

11. The computer program product of claim 8, wherein the last extracted ultrasonic audio QR code further comprises metadata, the metadata comprising a location where the audio content is accessible and an identity of the audio content, wherein in the playing of the audio content, the computing client device is further caused to:
   connect to the location where the audio content is accessible;
   access the audio content using the identity;
   match the location information in the last extracted ultrasonic QR code with a given location in the audio content; and
   play the audio content starting at the given location.

12. The computer program product of claim 8, wherein the computing client device does not have a network connection to the other client device.

13. The computer program product of claim 8, wherein the modified audio content comprising a plurality of ultrasonic audio QR codes overlaid on the audio content in a periodic manner, wherein each of the plurality of ultrasonic audio QR codes corresponds to a given location in the audio content.

14. The computer program product of claim 8, wherein in the playing of the determining that the playing of the modified audio content has stopped, the computing client device is further caused to:
   determine that the client device no longer hears any ultrasonic audio.

15. A system comprising:
   a computing client device; and
   a computer readable storage medium having program instructions embodied therewith, the program instructions executable by a computing client device to cause the computing client device to:
   listen for ultrasonic audio;
   hear a playing of a modified audio content by another client device, the modified audio content comprising audio content and at least one ultrasonic audio quick response (QR) code overlaid on the audio content, the at least one ultrasonic audio QR code comprising at least location information corresponding to a location in the audio content and a URL hyperlink;
   extract the location information and the URL hyperlink in the at least one ultrasonic audio QR code from the modified audio content locally without accessing an external computing device;
   determine that the playing of the modified audio content has stopped;
   after determining that the playing of the modified audio content has stopped, receive a command to resume playing of the audio content on the client device;
   in response to the command, accessing, by the client device, the URL hyperlink from the ultrasonic QR code;
   in response to the command, retrieve location information in a last extracted ultrasonic audio QR code; and
   play the audio content starting at a location in the audio content corresponding to the location information in the last extracted ultrasonic audio QR code.

16. The system of claim 15, wherein in the hearing of the playing of the modified audio content by the other client device, the computing client device is further caused to:
   capture audio signals output by the other client device, the audio signals comprising audible frequencies containing the audio content and ultrasonic frequencies containing the at least one ultrasonic audio QR code.

17. The system of claim 16, wherein in the extracting of the at least one ultrasonic audio QR code, the computing client device is further caused to:
   detect pulses in the ultrasonic frequencies in the audio signals; and
   convert the pulses into at least the location information in the at least one ultrasonic audio QR code.

18. The system of claim 15, wherein the last extracted ultrasonic audio QR code further comprises metadata, the metadata comprising a location where the audio content is accessible and an identity of the audio content, wherein in the playing of the audio content, the computing client device is further caused to:
- connect to the location where the audio content is accessible;
- access the audio content using the identity;
- match the location information in the last extracted ultrasonic QR code with a given location in the audio content; and
- play the audio content starting at the given location.

19. The system of claim 15, wherein the computing client device does not have a network connection to the other client device.

20. The system of claim 15, wherein the modified audio content comprising a plurality of ultrasonic audio QR codes overlaid on the audio content in a periodic manner, wherein each of the plurality of ultrasonic audio QR codes corresponds to a given location in the audio content.

* * * * *